United States Patent [19]
Wittenbach

[11] Patent Number: 4,505,420
[45] Date of Patent: Mar. 19, 1985

[54] WELDING SPACER

[75] Inventor: Paul G. Wittenbach, Bartlesville, Okla.

[73] Assignee: Phillips Petroleum Company, Bartlesville, Okla.

[21] Appl. No.: 466,692

[22] Filed: Feb. 15, 1983

[51] Int. Cl.³ .................... B23K 31/02; B23K 37/04
[52] U.S. Cl. ..................... 228/212; 228/57; 285/22
[58] Field of Search .............. 228/57, 248, 49 R; 285/22, 212

[56] References Cited

U.S. PATENT DOCUMENTS

| 1,810,825 | 6/1931 | Furrer | 285/22 |
| 1,872,240 | 8/1932 | Burnish | 285/22 |
| 3,338,499 | 8/1967 | Gilbert | 228/57 |
| 3,574,377 | 4/1971 | Petitt | 285/22 X |
| 3,917,149 | 11/1975 | Breton et al. | 228/248 X |
| 4,342,606 | 8/1982 | Notton | 228/248 X |
| 4,346,918 | 8/1982 | Lycan | 285/22 |

OTHER PUBLICATIONS

J. Laskonis et al., "Socket Welds–Inexpensive Design For Small Diameter Piping", *Welding Journal*, Feb. 1982, pp. 50, 51.

*Primary Examiner*—Kenneth J. Ramsey
*Attorney, Agent, or Firm*—French and Doescher

[57] ABSTRACT

A method of joining a first pipe having an outer surface and an annular end face and a fitting having an end face surrounding a shoulder recessed therein which includes inserting a spacer having a predetermined thickness and formed of a synthetic resin into the recess in abutment with the annular shoulder followed by inserting the annular end face of the pipe into the recess until the annular end face, the spacer and the annular shoulder are in mutual contact, temporarily tack welding the pipe to the fitting to establish spacing between the annular end face of the pipe and the annular shoulder of the fitting, and permanently welding the pipe to the fitting. In one embodiment, the heat from the permanent welding step vaporizes the spacer leaving a gap of predetermined size between the confronting annular end face of the pipe and the annular shoulder of the fitting. Also disclosed are a suitable fitting for use in joining a pipe and the fitting, which fitting includes a spacer constructed of synthetic resin material. Various configurations of spacers suitable for use in the fitting and practicing the method are also disclosed.

21 Claims, 19 Drawing Figures

WELDING SPACER

The present invention relates generally to the art of welding. In one aspect the invention relates to a method of welding pipe. In another aspect the invention relates to apparatus employed in the welding of pipe. In yet another aspect the invention relates to a spacer employed in the welding of pipe.

In the assembly of field run piping it is well known to use both socket weld joints and butt weld joints. The selection of a socket weld joint design over a butt weld design in field run piping 10 in. (25.4 cm) or less in diameter is based on several advantages provided by the socket weld joint. Among these advantages are reduced fit-up time, reduced welding skill requirement, and minimal preparation of the pipe ends to be welded. There are, however, certain techniques that are mandatory to produce a satisfactory weld joint. In addition to the use of a properly qualified welder and a proper welding procedure, the fit-up must provide a gap between the pipe end face and the socket weld fitting into which it is positioned before welding. The function of the gap is to permit thermal expansion of the pipe. Without the gap, the heat of welding as well as the heat from hot process fluids flowing through the finished piping can cause the pipe to expand at a faster rate than the fitting. If the pipe end face abutts or bottoms against the socket fitting, the thermal growth of the pipe applies a strain on the weld, possibly producing cracks in the root of the weld. A similar situation is encountered during the cooling and resulting contraction of the weld (solidification of the weld).

Failures have also been observed in socket welds produced without the necessary gap when the weld joint is subjected to thermal cycling during service. The mechanism of such thermal cycling weld failures is similar to the mechanism causing failure during welding. Rapid temperature changes cause the pipe to expand against the bottom of the fitting, resulting in straining and cracking the weld.

Construction codes such as ANSI and ASME permit socket welds to be used, provided a minimum gap of 1/16 in. (1.6 mm) is established between the pipe end and the bottom of the socket prior to welding. A typical fit-up sequence to comply with such construction codes comprises (a) driving the pipe into the socket fitting until it bottoms, (b) marking the pipe and fitting at a predetermined distance from the fitting face, and (c) withdrawing the pipe 1/16 in. (1.6 mm) and tack welding the pipe to the fitting. The marking of the pipe and fitting is provided by scribe marks which are usually placed far enough from the weld that they will be visible after welding for inspection purposes.

An alternative technique to that described above is also known in the art and involves the use of a contraction ring. One such contraction ring which is presently being employed is formed of cold-formed stainless steel of a proper thickness to form a proper gap between the pipe end and the socket fitting shoulder. Such rings produce the required gap without the necessity of scribing the pipe and fitting and withdrawing the pipe from the fitting. Typically, contraction rings are placed into the socket fittings prior to the time of actual welding, such as at the time of warehousing of the socket fitting. Where post-weld inspection is required, such fittings with contraction rings installed therein can be marked at the point of installation of the contraction ring to identify the presence of the ring therein.

The fit-up sequence using such contraction rings involves inserting the pipe into the socket fitting against the ring followed by tack welding the pipe to the fitting. The steel contraction ring must be designed in such a manner as to allow the pipe to expand longitudinally during welding. Typically this is accomplished by stamping the ring with a plurality of corrugations extending circumferentially therearound to provide a resilient spring action when subjected to the force of the expanding pipe during welding. After welding, each contraction ring remains in the annular space between the end face of the pipe and the shoulder of the socket fitting.

It will be readily apparent that the one-time use of a stamped, stainless steel contraction ring at each socket weld is a fairly expensive technique. It would, therefore, be advantageous to employ a contraction ring or welding spacer to achieve the desired gap in a socket welding operation which is less expensive than the prior art contraction rings.

Accordingly, it is an object of the present invention to provide an improved method of producing socket welds.

Another object of the invention is to provide a more economical method of producing socket welds.

Yet another object of the invention is to provide an improved spacer for use in the forming of socket welds.

Still another object of the invention is to provide a welding spacer which is less expensive than those presently employed.

Another object of the invention is to provide method and apparatus for forming socket welds which are simple, economical reliable, meet current code requirements and overcome the deficiencies of prior art methods and apparatus for forming socket welds.

Other aspects, objects and advantages of the present invention will become apparent from consideration of the instant specification and appended claims with reference to the drawing in which:

Figure 1:
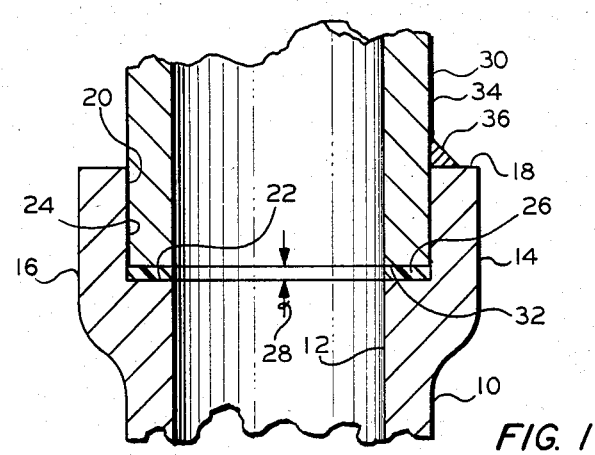
FIG. 1 is a cross-sectional view taken along the center line of a socket joint between a pipe and a socket fitting illustrating a spacer constructed in accordance with the present invention and installed therebetween to set a predetermined gap between the end face of the pipe and the shoulder of the socket fitting prior to welding.
Figure 2:
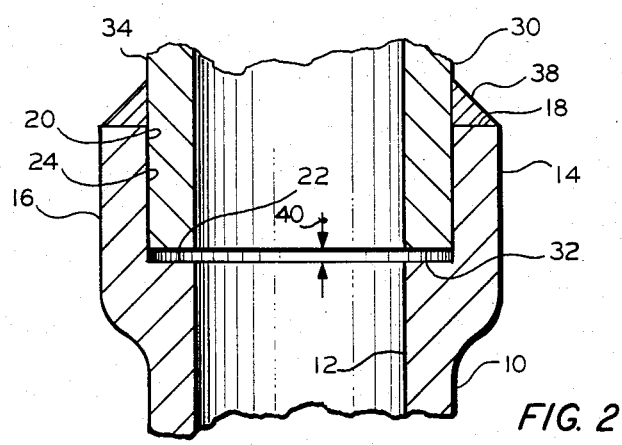
FIG. 2 is a cross-sectional view similar to FIG. 1 illustrating the pipe and socket fitting subsequent to welding with a predetermined gap between the end face of the pipe and the shoulder of the socket fitting.

Referring now to the drawings, FIGS. 1 and 2 illustrate the method and apparatus of the present invention. A pipe 10 having a passage 12 therethrough is provided with a fitting 14 on one end therefore. In the embodiment illustrated in FIGS. 1 and 2, the fitting 14 is in the form of a belled end 16 formed on one end portion of the pipe 10. The belled end terminates with an end face 18. The passage 12 extends into the fitting 14 and includes a recess 20 formed therein coaxial with the remainder of the passage 12 and communicating with the end face 18. A shoulder 22 extends inwardly from the inner surface 24 of the recess 20 and communicates with the remainder of the passage 12. The inner surface 24 also communicates with the end face 18.

A spacer 26 is disposed within the recess 20 abutting the shoulder 22. The spacer 26 has a predetermined thickness as shown at 28.

A second pipe 30 having an end face 32 is positioned with the end face 32 in abutting relation with the spacer 26 as shown in FIG. 1. When the second pipe 30 is so positioned relative to the fitting 14, the outer surface 34 of the pipe 30 and the end face 18 of the fitting 14 are preferably tack welded together as shown at 36 to temporarily secure the second pipe 30 within the fitting 14 of the pipe 10 with the end face 32 of the second pipe 30 spaced apart from the shoulder 22 of the recess 20 by means of the spacer 26.

Subsequent to the application of the track weld 36 between the outer surface 34 and the end face 18, the second pipe 30 can be permanently secured to the fitting 14 by the application of welding metal along the juncture between the outer surface 34 and the end face 18 as shown in FIG. 2 at 38. As is conventionally known, suitable weld metal is applied as shown at 38 by the application of heat to the fitting 14, pipe 30 and weld metal sufficient to secure fusion among these three elements along the juncture between the outer surface 34 and the end face 18. It will be understood that the permanent weld 38 is preferably a continuous weld extending completely around the juncture between the outer surface 34 of the pipe 30 and the end face 18 of the fitting 14 in order to achieve a fluid tight seal therebetween.

The spacer 26 can preferably be made of a material, such as a synthetic resin material, which, when subjected to the heat necessary to achieve the permanent weld 38, is vaporized thus leaving a gap between the end face 32 of the pipe 30 and the shoulder 22 of the fitting 14 as shown in FIG. 2 at 40, the gap 40 being established by the previous positioning of the spacer 26 therebetween the corresponding in size to the predetermined thickness 28 of the spacer 26. Such resin materials which can be employed in the construction of the spacers of the present invention include, but are not limited to, acetals, acrylics, cellulosics, nylon, poly(phenylene oxide), polybutylene, polycarbonate, polyester, polyethylene, poly(methyl pentene), polypropylene, polystyrene, thermoplastic elastomers, and mixtures of any two or more thereof. The gap 40 can be any suitable gap desired which will permit the necessary amount of thermal elongation of the pipe 30 relative to the fitting 14 without the end face 32 of the pipe 30 abuttingly engaging the shoulder 22 of the fitting 14. A suitable gap 40 and corresponding thickness 28 of the spacer 26 is generally in the range from about 1/16 in. to about 1/8 in.

While the fitting 14 is illustrated as forming the terminal end portion of the pipe 10, it will be understood that such a fitting suitable for weld connection to the end of a pipe received therein and employing a spacer 26 to achieve the desired gap therebetween can be employed in structures other than a pipe. For example, such structures can include tanks, manifolds, reactors, or other vessels or fixtures which might be advantageously secured by welding to a pipe.

It will also be understood that the spacer 26 can, under certain circumstances, also be constructed of a material, such as a synthetic resin material, which will retain its integrity during and subsequent to the application of heat to the fitting and pipe received therein to produce the permanent weld. Such resin materials include, but are not limited to polytetrafluoroethylene and poly(arylene sulfide), e.g., poly(phenylene sulfide). Under such circumstances, it is necessary for the spacer 26 to be constructed in a configuration and/or of a material which is of sufficient resilience that thermal elongation of the pipe relative to the fitting which reduces the gap 40 between the confronting end face 32 and shoulder 22 can be accommodated by compression of the spacer 26 without applying sufficient strain to the weld 38 to cause a fracture thereof.

Figure 3:
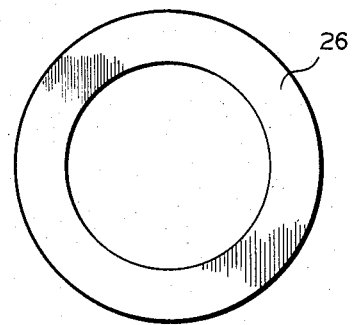
FIG. 3 is a top plan view of the spacer of FIG. 1.
Figure 4:
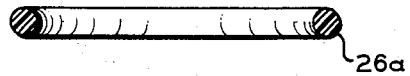
FIGS. 4–13 are cross-sectional views of alternate embodiments of spacers constructed in accordance with the invention.
Figure 5:
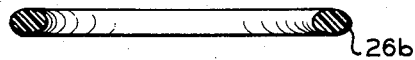
Figure 6:
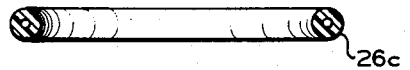
Figure 7:
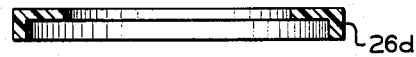
Figure 8:
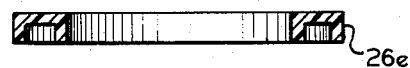
Figure 9:
Figure 10:
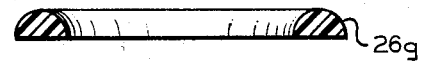
Figure 11:
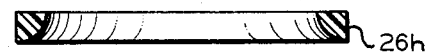
Figure 12:
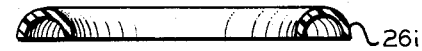
Figure 13:
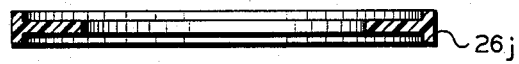

FIG. 3 is a top plan view of the spacer 26 wherein the spacer 26 is shown to be circular or annular in shape. FIGS. 4–13 each illustrate a cross-sectional variant of the spacer described above. Each of the spacers illustrated in FIGS. 4–13 has a different cross-section configuration taken along a cutting plane parallel to the axis of the passage in which the spacer is to be installed. FIG. 4 illustrates spacer 26a which is characterized by a substantially circular cross section. FIG. 5 illustrates spacer 26b which is characterized by an elliptical cross section. FIG. 6 illustrates spacer 26c which is characterized by a circular hollow cross section. FIG. 7 illustrates spacer 26d which is characterized by a L-shaped cross section. FIG. 8 illustrates spacer 26e which is characterized by a generally U-shaped cross section. FIG. 9 illustrates spacer 26f which is characterized by a generally X-shaped cross section. FIG. 10 illustrates spacer 26g which is characterized by a generally semi-circular cross section. FIG. 11 illustrates spacer 26h which is characterized by a generally quarter circular cross section. FIG. 12 illustrates spacer 26i which is characterized by a generally C-shaped cross section. FIG. 13 illustrates spacer 26j which is characterized by a generally T-shaped cross section.

Figure 14:
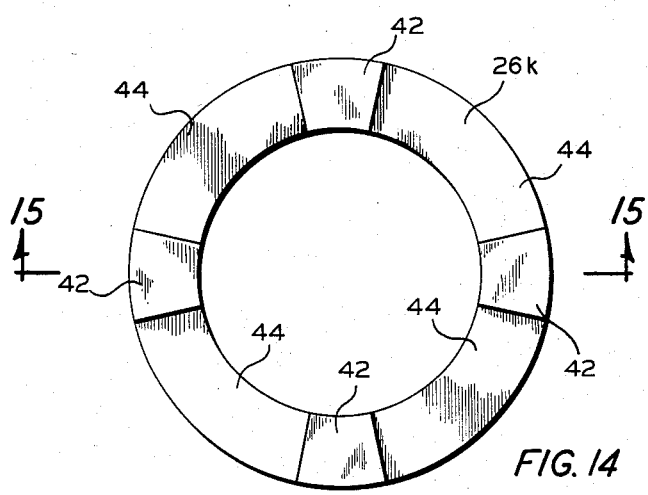
FIG. 14 is a top plan view of another embodiment of spacer constructed in accordance with the invention.
Figure 15:
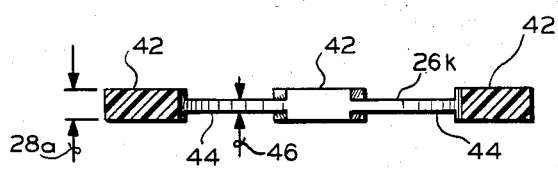
FIG. 15 is a cross-sectional view taken along line 15—15 of FIG. 14.

FIGS. 14 and 15 illustrate an alternate embodiment of the spacer of the present invention which is designated by the reference character 26k. The spacer 26k is characterized by an annular shape with four portions or nodes 42 circumferentially spaced thereon each having an identical first thickness as shown at 28a. The thickness 28a will achieve the desired gap 40 when the spacer 26k is employed as described above for the spacer 26. Each of the portions or nodes 42 is circumferentially spaced from the next adjacent portion or node 42 by a second portion 44 each having a thickness as shown at 46 which is less than the thickness 28a of the nodes or portions 42. Such configuration of the spacer 26k, as well as the configurations of the spacers illustrated in FIGS. 4–13, provides a spacer which can achieve the desired gap 40 while utilizing a smaller quantity of synthetic resin material than is required in the construction of the spacer 26 of generally rectangular cross section. Thus, it will be seen that the various embodiments of spacers illustrated in FIGS. 4–15 would require less heat from the welding operation to vaporize the spacers from the desired gap 40. It should be noted that any of the embodiments of the spacer of the present invention disclosed herein can also be made of a porous or foam-type resin material to facilitate either the vaporization of the spacer by the welding heat applied thereto or to enhance the resiliency of the spacer in the event a resin is selected which is not intended to be vaporized by the heat employed in producing the permanent weld 38.

Figure 16:
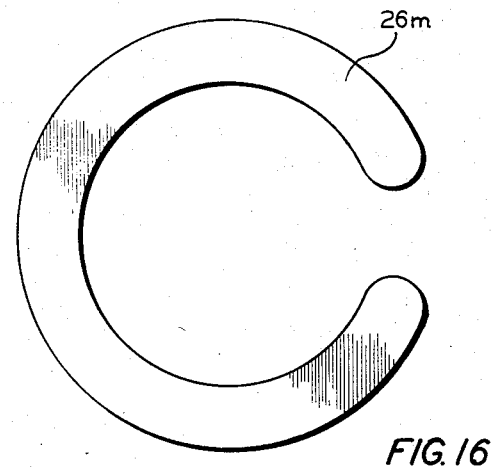
FIG. 16 is a top plan view of yet another embodiment of spacer constructed in accordance with the invention.

FIG. 16 illustrates another embodiment of spacer 26m which is generally C-shaped when viewed in plan. The configuration of the spacer 26m can be advantageously employed to facilitate the retention of the spacer within the recess 20 by means of resilient self-biasing. It will be readily apparent that a spacer 26m can have an outer diameter in the relaxed position which is slightly greater than the diameter of the inner surface 24 which would allow the spacer 26m to be deformed by squeezing together at the open ends thereof to position it within the recess 20 and then release to allow its internal bias to expand the spacer against the inner surface 24 and retain it in proper position adjacent and abutting the shoulder 22.

Figure 17:
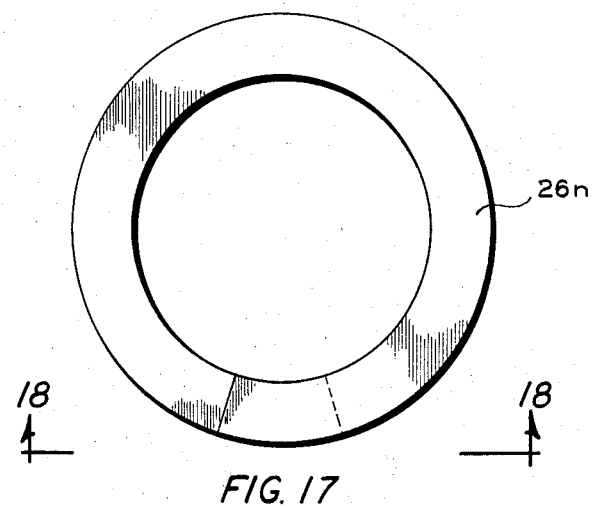
FIG. 17 is a top plan view of still another embodiment of spacer constructed in accordance with the invention and illustrating its fully closed position.
Figure 18:
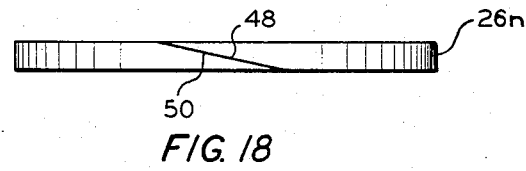
FIG. 18 is an elevational view taken along line 18—18 of FIG. 17.
Figure 19:
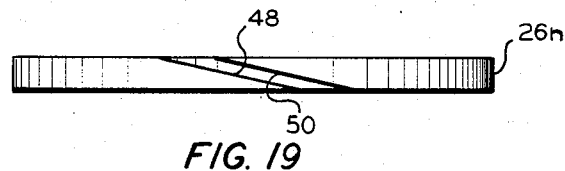
FIG. 19 is an elevational view similar to FIG. 18 illustrating the open position of the spacer.

FIGS. 17, 18 and 19 illustrate another embodiment of spacer 26n wherein the annular spacer 26n is split and the opposite confronting ends 48 and 50 are generally parallel to each other and are inclined at an angle of less than 90° to the shoulder 22 of the recess 20 when the spacer 26n is positioned in abutting relation thereto. FIG. 18 illustrates the spacer 26n in a fully compressed position with the confronting ends 48 and 50 in contact with one another to facilitate the insertion of the spacer 26 in the recess 20 into abutment with the shoulder 22. FIG. 19 illustrates the spacer 26n in its relaxed position with the confronting ends 48 and 50 spaced apart in response to the internal bias of the resilient spacer 26n, under which conditions the spacer 26n would expand into engagement with the inner surface 24 of the recess 20 to thereby retain the spacer 26n within the recess 20 in abutment with the shoulder 22.

It should be understood that the spacer cross sections illustrated in FIGS. 4–13 as well as the spacer cross section illustrated in FIG. 1 can be employed in the spacer configurations illustrated in FIGS. 14–19. It will also be understood that suitable spacers may be advantageously manufactured by extruding a continuous strand of synthetic resin material in the shape of any of the spacer cross sections described above, and later cut to a desired length slightly less than the circumference of the inner surface 24 and inserted into the recess 20 in abutment with the shoulder 22. It should further be noted that spacers 26 and 26m can be punched from sheets of synthetic resin material of the desired thickness.

While the apparatus of the present invention has been described up to now with reference to pipes, fittings and spacers of generally round cross section when cut by a plane perpendicular to the passage therethrough, it will be understood that the invention applies equally well to pipes or conduits of non-circular cross section, such as, for example, square, rectangular, triangular, etc.

It should be noted that a particular advantage of the present invention is that a spacer of any of the disclosed configurations can be positioned within a fitting 14 in abutment with the shoulder 22 and retained therein by the internal bias of the resilient spacer at the time of manufacture of the fitting or the particular pipe or structure in which the fitting is employed. With the fitting and the spacer so installed, such assemblies can then be warehoused for later use at a construction site or the like. With the spacers previously installed as described, the welder at the site need not trouble himself with providing an appropriate spacer to achieve the desired gap 40 between the pipe and the fitting in order to meet the specific welding code involved since the spacer will be already pressed in the assembly.

Changes may be made in the combination and arrangement of parts or elements as heretofore set forth in the specification and shown in the drawing without departing from the spirit and scope of the invention as defined in the following claims.

I claim:

1. A method of joining a first pipe having an outer surface and an annular end face and a second pipe having a belled end surrounding an annular shoulder recessed therein, comprising:

(a) inserting a spacer having a predetermined thickness and formed of a synthetic resin material in the blended end of said second pipe adjacent the annular shoulder;

(b) inserting the annular end face of said first pipe in the belled end of said second pipe with the annular end face and the annular shoulder mutually contacting said spacer so that the annular end face and the annular shoulder are spaced apart by a distance substantially equal to the predetermined thickness of said spacer; and (c) depositing welding metal between the belled end of said second pipe and the outer surface of said first pipe to secure said first pipe to said second pipe with the annular end face of said first pipe spaced from the annular shoulder of said second pipe by said distance, and heating said first and second pipes at the locations of said welding metal to a temperature sufficient to vaporize said spacer and thereby leave a gap between the annular end face of said first pipe and the annular shoulder of said second pipe.

2. A method in accordance with claim 1 wherein step (c) is characterized further to include:

tack welding said first pipe to said second pipe to temporarily secure said first and second pipes together with said spacer at least substantially intact between the annular end face of said first pipe and the annular shoulder of said second pipe to establish said distance between the annular end face and the annular shoulder; and thereafter permanently welding said first and second pipes between the belled end of said second pipe and the outer surface of said first pipe.

3. A method in accordance with claim 1 wherein step (c) is characterized further to include:

tack welding said first pipe to said second pipe to temporarily secure said first and second pipes together with said spacer at least substantially intact between the annular end face of said first pipe and the annular shoulder of said second pipe to establish said distance between the annular end face and the annular shoulder; and thereafter permanently welding said first and second pipes between the belled end of said second pipe and the outer surface of said first pipe, whereby said first and second pipes are sufficiently heated at the location of said permanent welding to at least substantially vaporize said spacer thereby leaving a gap between the annular end face of said first pipe and the annular shoulder of said second pipe.

4. A method in accordance with claim 3 wherein step (c) comprises depositing said welding metal about the full circumference of the outer surface of said first pipe at its juncture with the belled end of said second pipe to provide a fluid tight seal between said first and second pipes.

5. A method of joining a pipe and a fitting, said pipe having an outer surface and an end face, and said fitting having an end face surrounding a shoulder recessed therein, comprising:
(a) inserting a spacer of predetermined thickness and formed of a synthetic resin in said fitting adjacent the recessed shoulder;
(b) inserting the end face of said pipe in said fitting with the end face of said pipe and the shoulder of said fitting mutually contacting the spacer so that the end face of said pipe and the shoulder of said fitting are spaced apart by a distance at least equal to the predetermined thickness of the spacer; and
(c) welding said pipe to said fitting with the end face of said pipe spaced from the shoulder of said fitting by said distance at least equal to the predetermined thickness of said spacer, and heating said pipe and said fitting at the juncture between the end face of said fitting and the outer surface of said pipe sufficiently to weld said pipe to said fitting and to vaporize said spacer thus leaving a gap between the end face of said pipe and the shoulder of said fitting.

6. A method in accordance with claim 5 wherein step (c) is characterized further to include:
tack welding said pipe and said fitting to temporarily secure said pipe to said fitting with said spacer between the end face of said pipe and the shoulder of said fitting at least substantially intact to thereby establish said distance between the end face of said pipe and the shoulder of said fitting; and
thereafter permanently welding said pipe and said fitting between the end face of said fitting and the outer surface of said pipe, whereby said pipe and said fitting are sufficiently heated at the location of said permanent welding to at least substantially vaporize said spacer thereby leaving a gap between the end face of said pipe and the shoulder of said fitting.

7. A method in accordance with claim 5 wherein step (c) is characterized further to include:
tack welding said pipe to said fitting to temporarily secure said pipe to said fitting with said spacer between the end face of said pipe and the shoulder of said fitting at least substantially intact to thereby establish said distance between the end face of said pipe and the shoulder of said fitting; and
thereafter permanently welding said pipe and said fitting between the end face of said fitting and the outer surface of said pipe.

8. A method in accordance with claim 7 wherein said step of permanently welding comprises depositing welding metal about the full circumference of the outer surface of said pipe at its juncture with the end face of said fitting.

9. A fitting for use in welding to one end of a pipe having an outer surface and a pipe end face, said fitting comprising:
a body of weldable material having a fitting end face;
a passage in said body, said passage including a recess having an inner surface generally conforming to the outer surface of said pipe and communicating with said fitting end face, a shoulder extending inwardly from said inner surface toward the center of said passage, and a second inner surface communicating with said inwardly extending shoulder; and
a spacer disposed within the recess adjacent said shoulder in said body, said spacer having a predetermined thickness and being constructed of a synthetic resin material which will vaporize when subjected to the heat applied to said fitting and said pipe when welding said fitting to said pipe.

10. A fitting in accordance with claim 10 wherein said spacer has an outer surface sized and shaped to be tightly received within the recess of said passage and retained within said recess adjacent said inwardly extending shoulder.

11. A fitting in accordance with claim 10 wherein said spacer is resilient and is retained within said recess by virtue of its internal bias which urges the outer surface of said spacer into frictional engagement with the inner surface of the recess.

12. A fitting in accordance with claim 9 wherein the first and second inner surfaces of said passage are generally cylindrically shaped and said spacer has a generally circular circumferential outer surface and a generally circular inner surface.

13. A fitting in accordance with claim 9 wherein said spacer is formed of a synthetic resin material selected from the group consisting of acetals, acrylics, cellulosics, nylon, poly(phenylene oxide), polybutylene, polycarbonate, polyester, polyethylene, poly(methyl pentene), polypropylene, polystyrene, thermoplastic elastomers, and mixtures of any two or more thereof.

14. A fitting in accordance with claim 9 wherein said spacer is annular.

15. A fitting in accordance with claim 14 wherein said annular spacer is split and the opposite ends of said split annular spacer are spaced a distance apart when said spacer is in a relaxed position, and, alternately, the opposite ends of said spacer are spaced a lesser distance apart when positioned within said recess.

16. A fitting in accordance with claim 15 wherein the confronting surfaces of the opposite ends of said spacer are generally parallel to each other and are inclined at an angle of less than 90° to the inwardly extending shoulder of the recess when said spacer is positioned in contact therewith.

17. A fitting in accordance with claim 9 wherein said spacer is C-shaped.

18. A fitting in accordance with claim 9 wherein the cross section of said spacer taken along a plane parallel to the axis of the center of said passage adjacent the shoulder is rectangular.

19. A fitting in accordance with claim 9 wherein the cross section of said spacer taken along a plane parallel to the axis of the center of said passage adjacent the shoulder is circular.

20. A fitting in accordance with claim 9 wherein the cross section of said spacer taken along a plane parallel to the axis of the center of said passage adjacent the shoulder is non-circular.

21. A fitting in accordance with claim 9 wherein said spacer comprises a plurality of spaced apart first portions each having said predetermined thickness and each spaced from a next adjacent first portion by a second portion having a second thickness less than said predetermined thickness.

* * * * *

UNITED STATES PATENT AND TRADEMARK OFFICE
CERTIFICATE OF CORRECTION

PATENT NO.   : 4,505,420
DATED        : March 19, 1985
INVENTOR(S)  : Paul G. Wittenbach It is certified that error appears in the above-identified patent and that said Letters Patent is hereby corrected as shown below:

In claim 1, line 23, change "blended" to --- belled ---.

Signed and Sealed this

Eighth Day of October 1985

[SEAL]

Attest:

DONALD J. QUIGG

Attesting Officer

Commissioner of Patents and Trademarks—Designate